United States Patent Office 3,035,264
Patented May 15, 1962

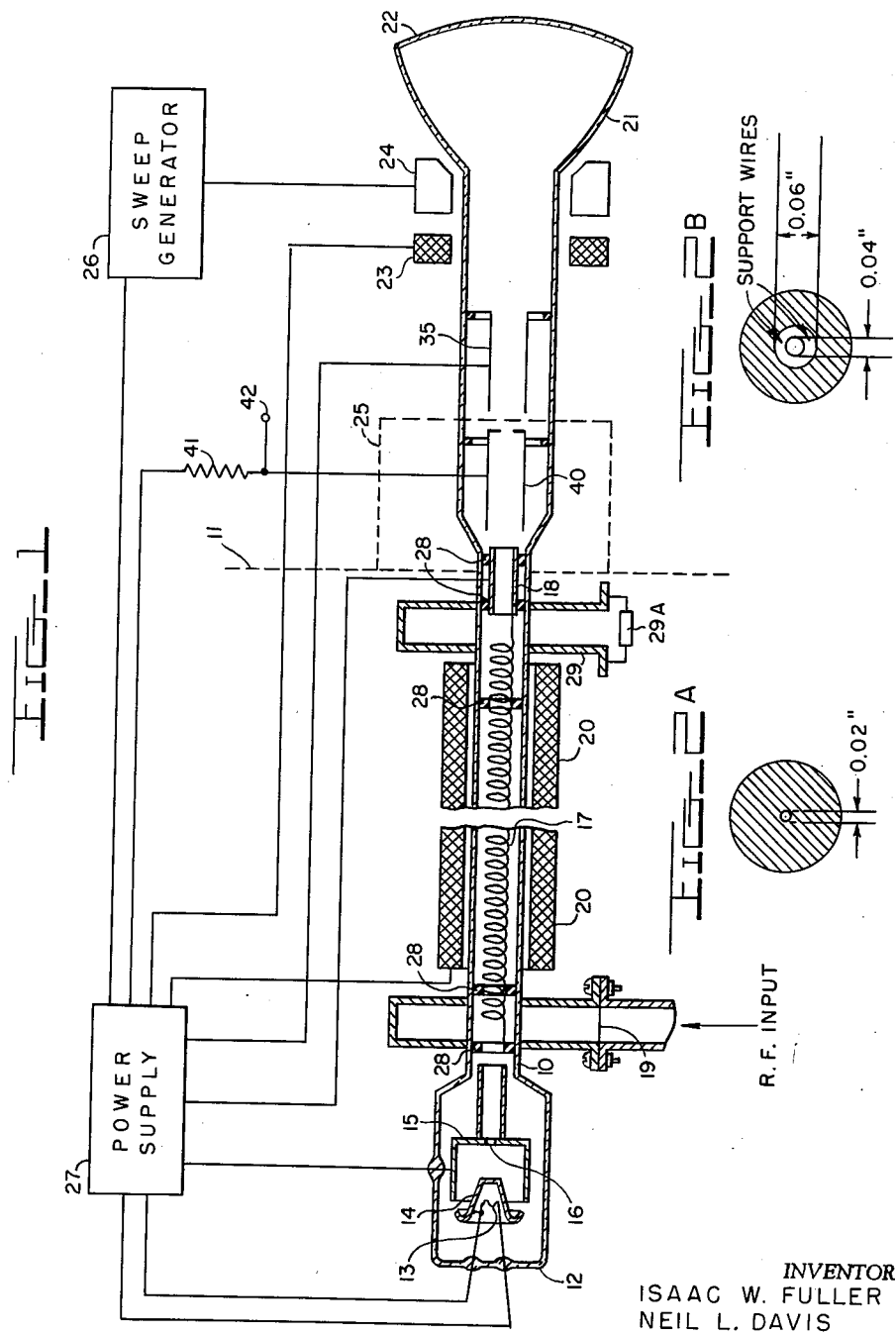

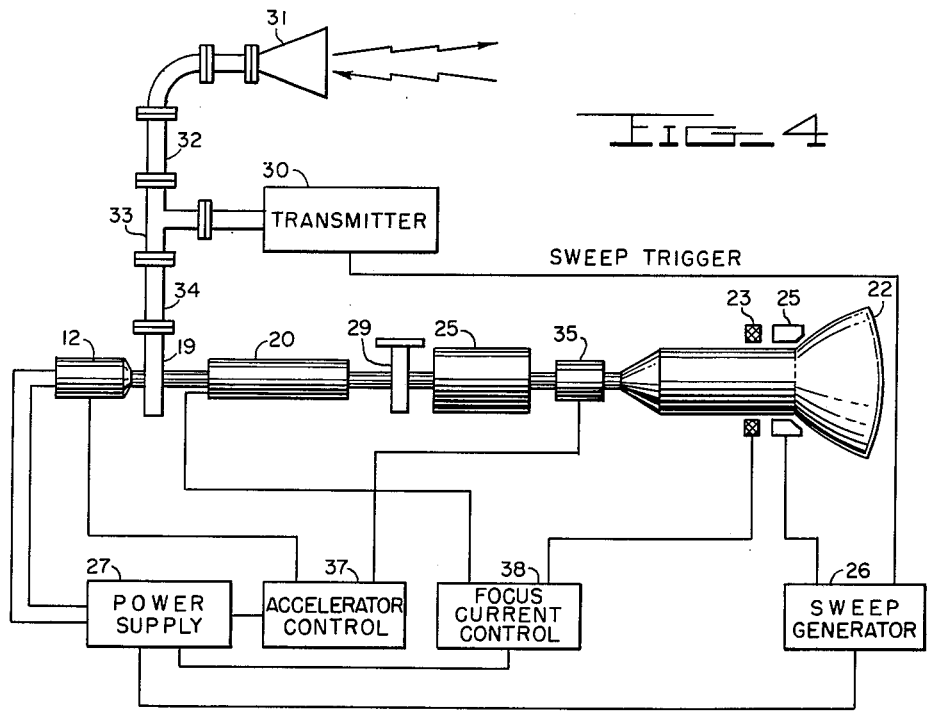
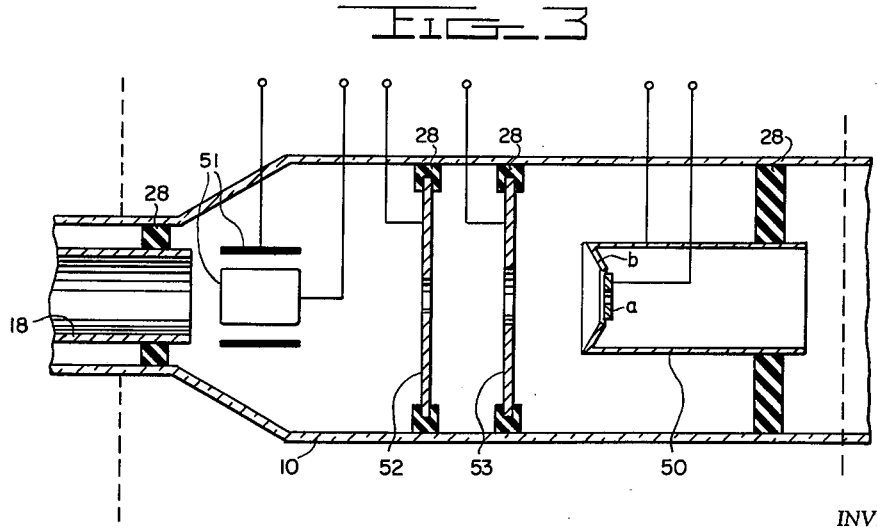

3,035,264
TRAVELING WAVE TUBE PRESENTATION
DEVICE
Isaac W. Fuller, Jr., and Neil L. Davis, Washington, D.C., assignors to the United States of America as represented by the Secretary of the Navy
Filed Aug. 21, 1957, Ser. No. 679,544
9 Claims. (Cl. 343—13)
(Granted under Title 35, U.S. Code (1952), sec. 266)

The invention described herein may be manufactured and used by or for the Government of the United States of America for governmental purposes without the payment of any royalties thereon or therefor.

This invention relates generally to fluorescent screen devices and more particularly to a device for detecting and indicating the presence of an ultra high frequency wave directly on a fluorescent screen.

There are many applications in the electronic art where it is desirable to produce a visual indication of the presence of an ultra high frequency wave. A notable example is found in any radar system. Conventional systems produce the presentation by passing the received wave through a complex broadband receiver in which the modulation is detected and amplified and applied to a cathode ray tube. It is well known that operation at ultra high frequencies, particularly broadband operation, requires many expensive and specially designed amplifier tubes and hardware.

Conventional amplifier tubes have proved inefficient at very high frequencies because of the greater effect of the interelectrode capacitance at high frequencies. As the frequency increases further the transit time of the electrons traveling between the electrodes also becomes a limiting factor. With unconventional tubes such as the reflex klystron, the upper limit has been extended by utilizing the transit time of the beam within a resonant chamber where it is velocity modulated. In another unconventional tube, the traveling wave tube, the upper limit has been extended by effectively slowing the radio frequency energy down to substantially the same velocity as that of an electrode beam. In the traveling wave tube, a wave of ultra high frequency energy is passed parallel to an electron beam and the component of wave motion paralleling the beam is slowed to substantially the same speed as the beam by passing it through, for example, a helix while the beam travels a straight path. It has been found that with the wave effectively traveling parallel to and at substantially the same speed as the electron beam, it imparts both velocity and density modulation to the beam. The present invention utilizes the modulated output of a traveling wave tube in its direct display of input wave energy.

The new and novel device described and claimed relates to the direct display device described and claimed in the copending application entitled "Traveling Wave Presentation Device," Serial No. 224,018, which was filed on May 1, 1951, by R. E. White, I. W. Fuller and N. L. Davis. The present invention affords a different type of direct display of the input wave energy.

It is an object of this invention to provide an intensity modulated radar type display on a fluorescent screen in a compact single envelope type device.

It is another object of this invention to provide a repeatable and easily adjustable device for the direct display of microwave energy on a fluorescent screen.

It is still another object of this invention to provide a device for the direct display of microwave energy on a fluorescent screen which permits dual operation as a detector and as a visual display means.

Other objects of this invention will become apparent upon a more comprehensive understanding of the invention for which reference is had to the following description and accompanying drawings, in which;

FIG. 1 is a representive embodiment of the invention partly in elevational cross-section and partly in block diagram.

FIGS. 2a and 2b depict two types of apertures which might be utilized for the iris element shown in the embodiment of FIG. 1.

FIG. 3 is a detailed drawing of an alternate embodiment of the velocity discriminator system employed in the embodiment of FIG. 1.

FIG. 4 is a typical radar system in which the embodiment of FIG. 1 is utilized to great advantage.

Briefly, the device of this invention produces a direct display of wide band microwave information on a fluorescent screen. In the device, an amplitude-modulated microwave signal is applied to the helix of a traveling wave tube amplifier. A portion of this wave energy is transferred to the electron beam of the traveling wave tube such that velocity and density modulation of the electron beam results. The modulation on the beam is detected in a velocity discriminator system and discrete portions of the beam are permitted to pass on to the screen. The intensity of the display on the fluorescent screen is proportional to the input RF energy. The entire device is contained in a single envelope.

Referring now to the drawings in detail, FIG. 1 shows in cross-section an evacuated glass envelope 10 which to the left of vertical dashed line 11 comprises a conventional traveling wave tube such as described by Pierce and Field in Proc. of I.R.E., February 1947, pages 108–111. The left end 12 of envelope 10 is enlarged to house an electron gun structure comprising a heater 13, a cathode 14, and an anode 15. Electrons from cathode 14 are attracted toward anode 15 which has an aperture 16 in its center, because of an accelerating potential applied thereto. Electrons are attracted through aperture 16 by an elongated helix 17 and collector 18 which are electrically joined together and energized by an accelerating potential. The helix 17 is closely wound of low resistance wire and has a diameter which is small compared with the operating wavelength of the system. The length of the wire making up the helix is several times the operating wavelength. Helix 17 is centrally disposed in envelope 10 and is supported by annular dielectric spacers 28 which also support the collector 18.

Radio frequency waves are fed in through waveguide 19 and coupled to the left or beam input end of helix 17. These waves are conducted along the helix 17 and because they move to the right in a spiral path, their progress in a direction parallel to the electron beam between cathode 14 and collector 18 is considerably slower than the speed of light. The ratio of the length of wire in the helix to the length of the helix is chosen so that the velocity of the wave component parallel to the beam is substantially the same as the velocity of the beam. An exemplary parallel wave velocity which has been found satisfactory in the 3600 mc. frequency range is $\frac{1}{13}$ the speed of light.

An elongated focusing yoke 20 disposed outside envelope 10 surrounds helix 17 and axially focuses the electron beam along the axis of the helix. Upon reaching the collector end of the helix the radio frequency waves are coupled to the output waveguide 29. In the embodiment of FIG. 1 the output waveguide 29 is terminated in its characteristic impedance 29A to prevent reflections of the wave back into the traveling wave tube. It is understood, of course, that the output waveguide 29 may be coupled to another network for further use, if desired and that it is not necessary that the waveguide 29 be terminated in an absorbent load. Should greater sensitivity be desired, one or more conventional traveling wave tubes connected in tandem may precede the tube modified in accordance with this invention. To effect the tandem connection the output wave guide of each preceding tube is connected in a conventional manner to the input waveguide of its succeeding tube.

To the right of dashed line 11 this device differs from conventional traveling wave tubes, the collector 18 is open-ended and does not stop the beam, and the envelope 10 terminates at the right in a presentation system 21 comprising a fluorescent screen 22, focusing element 23, and beam deflection means 24 assembled in the conventional manner. Interposed the traveling wave tube section and the presentation system is a velocity discriminator system 25.

With a sweep generator 26 connected to the deflection means 24, and a power supply 27 connected to operate the traveling wave tube and the sweep generator and to provide proper voltages for the velocity discriminator and the presentation systems added to the apparatus thus far described in connection with FIG. 1, a complete system of radio frequency oscillography is provided. This system will provide broadband operation at microwave frequencies and will operate with signals of only a few millivolts without preamplification.

Referring again to the forward portion of the device, it will be noted that the center portion of the helix 17, envelope 10, and focusing yoke 20 is cut away to shorten the space requirements of the drawing. It will be apparent from the previous discussion that the length and diameter requirements of the helix vary with the operating wavelength and are a factor in the bandwidth. As the frequency is decreased below the center frequency, the number of wavelengths in the helix is reduced and amplification falls off. As the frequency is increased above the center frequency, the field produced by the wave lies closer to the helix structure and has less effect on the electron beam, therefore amplification again falls off. In an actual example, for a center frequency of 3600 mc. a helix 11 inches long and ¼ inch in diameter was selected to reduce the effective velocity of the wave by a factor 13.

Considering now the operation of this invention, the indirectly heated cathode 14 produces an electron beam which is attracted to the right along the envelope 10 by the higher potential of the helix 17 and collector 18. The long focusing yoke 20 axially focuses the beam keeping it in the center of helix 17.

Radio frequency waves are picked up by helix 17 from waveguide 19 which is matched to the left and uncoiled end of helix 17. These waves travel to the right at substantially the same speed as the electron beam because of the retarding effect of the helix. Therefore a traveling wave is developed in the tube traveling at substantially the speed of the electron beam. Consequently the traveling field produced by the wave along the helix appears as a constant amplitude field to any given portion of the electron beam. Portions of the beam acted on by a wave crest tend to develop a bunching of electrons and the portions traveling in the region of the troughs tend to develop a thinning out of the electrons. Or in other words, the electrons in the troughs are accelerated or decelerated toward the adjacent crests. Thus both density and velocity modulation of the electron beam is produced. A more detailed explanation of this action is found in the above referred to article by Pierce and Field in the February 1947 Proc. of I.R.E. A mathematical explanation by Pierce is found on pages 111–123 of the same publication.

The beam which emerges from the traveling wave tube portion of the device (to the left of the dashed line in the drawing) is assumed to be a univelocity beam in the absence of an RF input at 19. Of course, in actuality the emergent beam contains electrons which are traveling at different velocities but for the practical purposes of the invention, the constant, single velocity consideration has been found to be a reasonable assumption.

The univelocity beam is focused directly on the aperture in iris element 40 of the velocity discriminator system 25. In operation, the potential applied to the iris element 40 is adjusted such that it is approximately the same as the cathode potential. At this potential most of the electrons impinging on the iris element 40 are repelled by the reverse voltage field between the iris element and the collector 18 and are returned to the collector.

When an input RF signal is applied to the traveling wave tube, some electrons are sped up relative to the univelocity beam and others are slowed down. In accordance with the invention those electrons with increased velocity are not returned to the collector 18 but instead proceed through the aperture to become the beam of the cathode ray tube section. The number of electrons which pass through the aperture increases with increased RF input signal until saturation of the beam sets in. Thus the device provides an intensity display on the screen of the cathode ray tube section which is proportional to the RF input signal. Coincident with this visual display, an electrical signal may be detected across the impedance 41 connected to the iris element 40 and to power supply 27. It will be seen that by adjustment of the potential applied to the iris element 40 the percentage of the traveling wave tube beam which passes the iris element may be varied. In addition, it will be seen that the application of signal voltage to the iris element 40 via terminal 42 permits direct modulation of the cathode ray tube beam.

FIGS. 2a and 2b show two aperture configurations which have been found suitable for the iris element 40. Of course, this invention is not limited to use of the two apertures shown in the drawings and other configurations might be employed in selected embodiments as desired. The exact aperture size is dependent upon the particular application of the device of this invention. It has been found that the aperture must be small enough to make focusing in the cathode ray section feasible and yet large enough to permit signal current to pass through. As an example, apertures of the type shown in FIG. 2a having a diameter of .02 to .10 inch have been employed and apertures of the type shown in FIG. 2b having inner and outer diameter of .04 inch and .06 inch respectively have also been employed.

FIG. 3 shows an alternate form of the velocity discriminator system which is substantially similar in operation to and may be directly substituted in place of the velocity discriminator system 25 shown in FIG. 1 but includes additional structural elements 51, 52 and 53, which are axially disposed between the iris element 50 and the collector 18. In actual practice it has been found that the traveling wave tube beam is not always in exact axial alignment. In most cases this defect could be corrected by a more precise assembly technique, of course, but an alternate means for correction is provided by the insertion of the orthogonal deflection system 51 which serves to center the beam before it reaches the iris element.

It has been found that the flat iris element 40 shown in FIG. 1 will reflect electrons in a reverse direction down the center of the traveling wave tube beam at certain current levels. To counteract this reverse direction stream of electrons, the iris element 50 shown in FIG. 3 has a concave surface facing the traveling wave tube beam which serves as a directive means to focus the repelled electrons. By focusing the repelled electrons within the confines of the tube structure and thus enables them to be more easily collected. As shown in FIG. 3, the iris element may comprise two separate concentric elements a and b. The purpose of these separate elements is to provide an adjustable biasing means for use in controlling the repelled electrons. In operation, the two concentric elements differ in potential by only a few volts and the two elements may be assumed to be at the same potential for most theoretical considerations.

The elements 52 and 53 which are interposed the iris element 50 and the collector 18 are both connected to power supply 27 and act to isolate the iris element 50 and the helix 17. That is, the elements 52 and 53 permit voltage variations on the helix 17 without necessitating a revision of the structural arrangement in the velocity discriminator 25. Of course, the elements 52 and 53 also serve, to some extent, as the collecting means for the repelled electrons. As an example, with the helix at 600 D.C. the elements 52 and 53 may be at 450 volts D.C. and 150 volts D.C., respectively. The potential on the iris element should be close to the cathode potential, 0 volt D.C., for example. The exact potential on the iris element 50 is adjusted in each application as required to pass only those velocities in excess of the average velocity of electrons in the univelocity beam.

The apparatus shown in FIG. 1 has all the necessary elements of a radar receiving system if the sweep generator 26 is synchronized with the radar transmitter. This invention is shown as the receiver-indicator of a radar system in FIG. 4. In FIG. 4 a pulse type radar transmitter is shown connected to a horn type antenna 31 through waveguide 32 and T-connection 33. Another section of waveguide 34 connects the antenna through the same T-connection to the traveling wave tube input waveguide 19. No receiver protective device such as a T-R box is required with this invention since there is no crystal in the receiver input to burn out and it is characteristic of the traveling wave tube to present degenerative gain characteristics to large amplitude signals and to have a rapid recovery time.

A trigger signal is applied from transmitter 30 to the range sweep generator 26. In FIG. 2 the power supply 27 is shown connected to the electron gun accelerating anode 15 and the cathode ray tube accelerator 35 via the accelerator control means 37 and to the focusing means 20 of the traveling wave tube and the focusing means 23 of the cathode ray tube, respectively.

In operation of the radar receiving system, the sweep begins to deflect the beam across the screen 22 when the transmitter 30 initiates a pulse. Energy reflected back from any objects in the path of the antenna 31 reenters the antenna and feeds through the waveguide to the helix in envelope 10 where it becomes a relatively slowly traveling wave which velocity modulates the electron beam to produce a spot of varying intensity on screen 22. The position of this spot on the range trace is an indication of the range of the reflecting object. This type of cathode ray display is commonly known in the art as "B" scan. It will be appreciated that by rotating the sweep in accordance with the rotation of the antenna, this may be converted to what is known as a "PPI" type display.

The practice of this invention is not limited to any particular embodiment of traveling wave tube. The electron gun structure may be a triode or pentode arrangement and the helix may be a number of different sizes. In fact it is not necessary to use a helix as long as some method of slowing the effective velocity of the wave is accomplished.

Although certain specific embodiments of this invention have been herein disclosed and described, it is to be understood that they are merely illustrative of this invention and modifications may, of course, be made without departing from the spirit and scope of the invention as defined in the appended claims.

What is claimed is:

1. In a radar system including a pulse transmitter and an antenna, a receiver indicator comprising an evacuated envelope; means disposed within said envelope for producing a first beam of electrons having a predetermined path therein; means for providing electrons within a portion of said first beam with a relatively constant univelocity; means for velocity modulating said univelocity portion of said first beam in accordance with an input radio signal; electron velocity discriminating means disposed in the path of said univelocity portion of said first beam; said discriminating means being operative to pass electrons in said first beam having velocities in excess of a predetermined velocity and to repel electrons in said first beam having velocities equal to and less than said predetermined value, said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area in synchronism with the pulsed output of said transmitter.

2. In a radar system including a pulse transmitter and an antenna, a receiver indicator comprising an evacuated envelope; traveling wave tube means disposed within said envelope and operative to produce velocity modulation of the traveling wave tube electron beam in accordance with an input signal; the electrons in a portion of said traveling wave tube beam being characterized by a substantially constant univelocity; electron velocity discriminating means disposed in the path of said univelocity portion of said traveling wave tube beam; said discriminating means being operative to pass electrons in said traveling wave tube beam having velocities in excess of a predetermined velocity and to repel electrons in said traveling wave tube beam having velocities equal to and less than said predetermined velocity; said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area in synchronism with the pulsed output of said transmitter.

3. In a radar system including a pulse transmitter and a movable scanning antenna, a receiver indicator comprising an evacuated envelope; traveling wave tube means disposed within said envelope and operative to produce velocity modulation of the traveling wave tube electron beam in accordance with an input signal; the electrons in a portion of said traveling wave tube beam being characterized by a substantially constant univelocity; electron velocity discriminating means disposed in the path of said univelocity portion of said traveling wave tube beam; said discriminating means being operative to pass electrons in said traveling wave tube beam having velocities in excess of a predetermined velocity and to repel electrons in said traveling wave tube beam having velocities equal to and less than said predetermined velocity; said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area in synchronism with the pulsed output of said transmitter, said sweep deflection means being rotatable in accordance with the movement of said scanning antenna.

4. A radio signal responsive device comprising an evacuated envelope; means disposed within said envelope for producing a first beam of electrons having a predetermined path therein; means for providing electrons within a portion of said first beam with a relatively constant univelocity; means for velocity modulating said univelocity portion of said first beam in accordance with an input radio signal; electron velocity discriminating means disposed in the path of said univelocity portion of said first beam; said discriminating means being operative to pass electrons in said first beam having velocities in excess of a predetermined velocity and to repel electrons in said first beam having velocities equal to and less than said predetermined value, said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area.

5. A radio signal responsive device comprising an evacuated envelope; means disposed within said envelope for producing a first beam of electrons having a predetermined path therein; means for providing electrons within a portion of said first beam with a relatively constant univelocity; means for velocity modulating said univelocity portion of said first beam in accordance with an input radio signal; electron velocity discriminating means disposed in the path of said univelocity portion of said first beam; said discriminating means being operative to pass electrons in said first beam having velocities in excess of a predetermined velocity and to repel electrons in said first beam having velocities equal to and less than said predetermined value, said predetermined velocity being at least as great as said univelocity; beam forming means operative to form a second beam composed of those electrons which pass said velocity discriminating means; electron sensitive display target means disposed to receive said second beam and visually responsive to the reception of said second beam in proportion to the number of electrons received thereby; and sweep deflection means operative to periodically sweep said second beam across said target area.

6. A radio signal responsive device comprising an evacuated envelope; means disposed within said envelope for producing a first beam of electrons having a predetermined path therein; means for providing electrons within a portion of said first beam with a relatively constant univelocity; means for velocity modulating said univelocity portion of said first beam in accordance with an input radio signal; electron velocity discriminating means disposed in the path of said univelocity portion of said first beam; said discriminating means comprising unidirectional electric field producing means adapted to provide a beam decelerating electric field; said discriminating means being operative to pass electrons in said first beam having velocities in excess of a predetermined velocity and to repel electrons in said first beam having velocities equal to and less than said predetermined value, said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area.

7. A radio signal responsive device comprising an evacuated envelope; traveling wave tube means disposed within said envelope and operative to produce velocity modulation of the traveling wave tube electron beam in accordance with an input signal; the electrons in a portion of said traveling wave tube beam being characterized by a substantially constant univelocity; electron velocity discriminating means disposed in the path of said univelocity portion of said traveling wave tube beam; said discriminating means being operative to pass electrons in said traveling wave tube beam having velocities in excess of a predetermined velocity and to repel electrons in said traveling wave tube beam having velocities equal to and less than said predetermined velocity; said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area.

8. A radio signal responsive device comprising an evacuated envelope; traveling wave tube means disposed within said envelope and operative to produce velocity modulation of the traveling wave tube electron beam in accordance with an input signal; the electrons in a portion of said traveling wave tube beam being characterized by a substantially constant univelocity in the absence of an input signal; electron velocity discriminating means disposed in the path of said univelocity portion of said traveling wave tube beam; said discriminating means being operative to pass electrons in said traveling wave tube beam having velocities in excess of a predetermined velocity and to repel electrons in said traveling wave tube beam having velocities equal to and less than said predetermined velocity; said predetermined velocity being at least as great as said univelocity; beam forming means operative to form a second beam composed of those electrons which pass said velocity discriminating means; electron sensitive display target means disposed to receive said second beam and visually responsive to the reception of said second beam in proportion to the number of electrons received thereby; and sweep deflection means operative to periodically sweep said second beam across said target area.

9. A radio signal responsive device comprising an evacuated envelope; traveling wave tube means disposed within said envelope and operative to produce velocity modulation of the traveling wave tube electron beam in accordance with an input signal; the electrons in a portion of said traveling wave tube beam being characterized by a substantially constant univelocity in the absence of an input signal; electron velocity discriminating means disposed in the path of said univelocity portion of said traveling wave tube beam; said discriminating means comprising unidirectional electric field producing means adapted to provide a beam decelerating electric field; said discriminating means being operative to pass electrons in said traveling wave tube beam having velocities in excess of a predetermined velocity and to repel electrons in said traveling wave tube beam having velocities equal to and less than said predetermined value; said predetermined velocity being at least as great as said univelocity; beam forming means operative to form a second beam composed of those electrons which pass said velocity discriminating means; electron sensitive target means disposed to receive said second beam and responsive to the reception of said second beam in proportion to the number of electrons received thereby; and sweep deflection means operative to periodically sweep said second beam across said target area.

References Cited in the file of this patent

UNITED STATES PATENTS 2,630,544    Tiley                 Mar. 3, 1953
2,653,270    Kompfner           Sept. 22, 1953

OTHER REFERENCES

Aviation Week, page 75, Sept. 17, 1956.